US008892560B2

(12) United States Patent
Secord et al.

(10) Patent No.: US 8,892,560 B2
(45) Date of Patent: Nov. 18, 2014

(54) INTUITIVE MANAGEMENT OF ELECTRONIC FILES

(75) Inventors: Adrian Secord, Ontario (CA); Andrea Mangini, Santa Cruz, CA (US)

(73) Assignee: Adobe Systems Incorporated, San Jose, CA (US)

(*) Notice: Subject to any disclaimer, the term of this patent is extended or adjusted under 35 U.S.C. 154(b) by 647 days.

(21) Appl. No.: 12/324,740

(22) Filed: Nov. 26, 2008

(65) Prior Publication Data

US 2013/0166560 A1 Jun. 27, 2013

Related U.S. Application Data (60) Provisional application No. 61/093,223, filed on Aug. 29, 2008.

(51) Int. Cl.
*G06F 7/08* (2006.01)
*G06F 17/30* (2006.01)

(52) U.S. Cl.
CPC .... *G06F 17/30038* (2013.01); *G06F 17/30047* (2013.01)
USPC ............ 707/738; 707/741; 707/758; 707/821

(58) Field of Classification Search
CPC ................... G06F 17/30268; G06F 17/30038; G06F 17/30047
USPC ................... 707/2, 7, 204, 999.002, 999.007, 707/999.204, 738, 741, 749, 752, 758, 821, 707/754, 915, 999.102, 999.107, 751
See application file for complete search history.

(56) References Cited

U.S. PATENT DOCUMENTS

| 7,130,864 | B2 * | 10/2006 | Lin et al. ............................. 1/1 |
| 7,386,806 | B2 * | 6/2008 | Wroblewski .................. 715/788 |
| 7,392,296 | B2 * | 6/2008 | McIntyre et al. ............. 709/219 |
| 7,437,005 | B2 * | 10/2008 | Drucker et al. ............... 382/224 |
| 7,461,090 | B2 * | 12/2008 | Blinn et al. ........................... 1/1 |
| 8,122,069 | B2 * | 2/2012 | Soules et al. .................. 707/821 |
| 2008/0086511 | A1 * | 4/2008 | Takao et al. ................ 707/104.1 |
| 2009/0254515 | A1 * | 10/2009 | Terheggen et al. ............... 707/2 |
| 2010/0332485 | A1 * | 12/2010 | Lahti et al. .................... 707/758 |

* cited by examiner

*Primary Examiner* — Bruce Moser
(74) *Attorney, Agent, or Firm* — Wolfe-SBMC (57) ABSTRACT

A method includes identifying interrelated files stored on one or more storage devices for each topic grouping. The interrelated files correspond to a particular topic grouping and are determined based on metadata associated with the interrelated files. A relative importance for each of the interrelated files within each topic grouping is determined. The relative importance indicates an importance of each of the interrelated files in a corresponding topic grouping relative to the other files in the corresponding topic grouping based on metadata associated with the interrelated files. A montage of visual representations of the interrelated files for each topic grouping is displayed using a visual indication of the relative importance.

24 Claims, 6 Drawing Sheets

FIG. 3

INTUITIVE MANAGEMENT OF ELECTRONIC FILES

CLAIM OF PRIORITY

This application claims priority under 35 USC §119(e) to U.S. Patent Application Ser. No. 61/093,223, filed on Aug. 29, 2008, the entire contents of which are hereby incorporated by reference.

BACKGROUND

The present disclosure relates to intuitive management of electronic files. Using a computer file management system, a file can be created, edited, saved, opened or loaded into memory, and/or closed. Directories can be used to organize files. Files can also be managed based on their location on a storage device. Typically, computer files are stored in a storage medium in binary form, and are not necessarily organized into any structure due to disk storage fragmentation. However, the grouping of files into directories, in operating systems like DOS, Unix, Linux, or folders, in operating systems like Mac OS and Microsoft Windows, is often accomplished by updating a table, such as the File Allocation Table or NTFS for Microsoft Windows, that indexes file information. In this table or index, the physical location and its position in the hierarchy of directories are stored.

SUMMARY

This specification describes technologies relating to intuitive management of electronic files.

In general, one aspect of the subject matter described in this specification can be embodied in a method that includes identifying interrelated files stored on one or more storage devices for each topic grouping. The interrelated files correspond to a particular topic grouping and are determined based on metadata associated with the interrelated files. A relative importance for each of the interrelated files within each topic grouping is determined. The relative importance indicates an importance of each of the interrelated files in a corresponding topic grouping relative to the other files in the corresponding topic grouping based on metadata associated with the interrelated files. A montage of visual representations of the interrelated files for each topic grouping is displayed using a visual indication of the relative importance.

In general, another aspect of the subject matter described in this specification can be embodied in a method that includes identifying multiple sets of interrelated files. A relative significance of each file within each set is determined. The relative significance is based on metadata associated with each file within each set. The metadata is associated with each file based on user interactions with the file. Visual representations corresponding to at least a portion of the files in each set are displayed. The displayed visual representations for each set are visually grouped on a display distinct from the displayed visual representations for other sets and the displayed representations within each set are displayed according to the relative significance of each of the displayed files in each set.

Other embodiments of these aspects include corresponding systems, apparatus, and computer program products. These and other embodiments can optionally include one or more of the following features. Determining the relative importance can be further based on interactions of a user with a computer system. The relative importance can include a first relative importance, the user can include a first user, and the embodiments can further include determining a second relative importance for each of the interrelated files. The second relative importance can be based on metadata associated with the interrelated files and interactions of a second user with the computer system.

The metadata can include data related to at least one of: file creation, file editing, file saving, opening an item after a search query, a duration of time that a file is open, a number of times that a file is accessed, or a forwarding of the file via an electronic mail message. The multiple interrelated files can include a first subset of interrelated files associated with a first file type, and a second subset of interrelated files associated with a second file type. The embodiments can further include: displaying a first group of visual representations of the first subset of interrelated files using a visual indication of the relative importance of each of the files in the first subset of interrelated files; and displaying a second group of visual representations of the second subset of interrelated files using a visual indication of the relative importance of each of the files in the second subset of interrelated files. The display of the first group of visual representations can be visually distinct from the display of the second group of visual representations.

The first subset of interrelated files associated with the first file type can include one of: a subset of Microsoft Bitmap files, a subset of Graphics Interchange Format files, a subset of Tagged Image File Format files, or a subset of Joint Photographic Experts Group files. The first subset of interrelated files associated with the first file type can include one of: a subset of image files, a subset of document files, a subset of spreadsheet files, a subset of electronic mail files, or a subset of web pages.

The interrelated files can include a first plurality of interrelated files, and the method can further include: identifying a second plurality of interrelated files stored on one or more storage devices; determining a relative importance for each of the second plurality of interrelated files, where the relative importance can be based on metadata associated with the second plurality of interrelated files; and displaying visual representations of the second plurality of interrelated files using a visual indication of the relative importance for each of the second plurality of interrelated files. The display of the visual representations of the first plurality of interrelated files can be visually distinct from the display of the visual representations of the second plurality of interrelated files. The metadata associated with the multiple interrelated files can include metadata associated with each of the interrelated files.

Particular embodiments of the subject matter described in this specification can be implemented to realize one or more of the following advantages. Each particular user of a computer system can be presented with files that are relevant to the particular user. The user experience can be enhanced and made more intuitive. The time needed to find and open files can be reduced, which can increase a user's efficiency.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An information management system can be used to facilitate a user's ability to manage, browse, and search documents, files and other electronically stored information in a computer system(s). In general, a user is presented with groupings of related files with the most relevant files being displayed most prominently. Relevance or importance can be based on the user's behavior, preferences, interaction history, and context. For example, a particular user can interact with files on a computer system used by several other users. Over time, the behaviors that the particular user engages in with a given group of electronic files or content is an indicator of what is relatively important to that particular user. Another user of the same system may interact with different groups of electronic files or even the same group of electronic files but in a manner different from the first user. Based on each user's interactions, the two users can be presented with different groupings of files, and/or they both can be presented with the same grouping of files but with different files within the groupings being emphasized for each user. This can be the case even when both users interact with the same content, but in different ways.

As another example, after a user types an email message, the user may attach a file to the message. The fact that the user attached the file to the email message can indicate that the file is important. The relevance of each file can be determined based on a variety of factors and metadata associated with the file, such as whether the file has been accessed or edited recently. The relevance can also be determined using the date that the file was created. The relevance can be determined in response to the user entering a semantic term, such as a search query or tag, and/or providing a reference object, such as an electronic photograph or document, which could be used to determine the focus of the current interest or retrieval task. The relevance can be measurable in terms that are specific to a particular user, in terms that are not specific to a particular user, and/or in terms that are a combination of user-specific and generic terms. The user, after being presented with the display of the files, can browse and choose the appropriate file for attachment, without necessarily navigating to the directory in the file system in which the file is stored. A user can be allowed to quickly access the content which is most interesting to them, regardless of the type of content it is or what application created it. These and other advantages may not apply to all embodiments. Other features, objects, and advantages of the invention will be apparent from the description and drawings, and from the claims.

Figure 1:
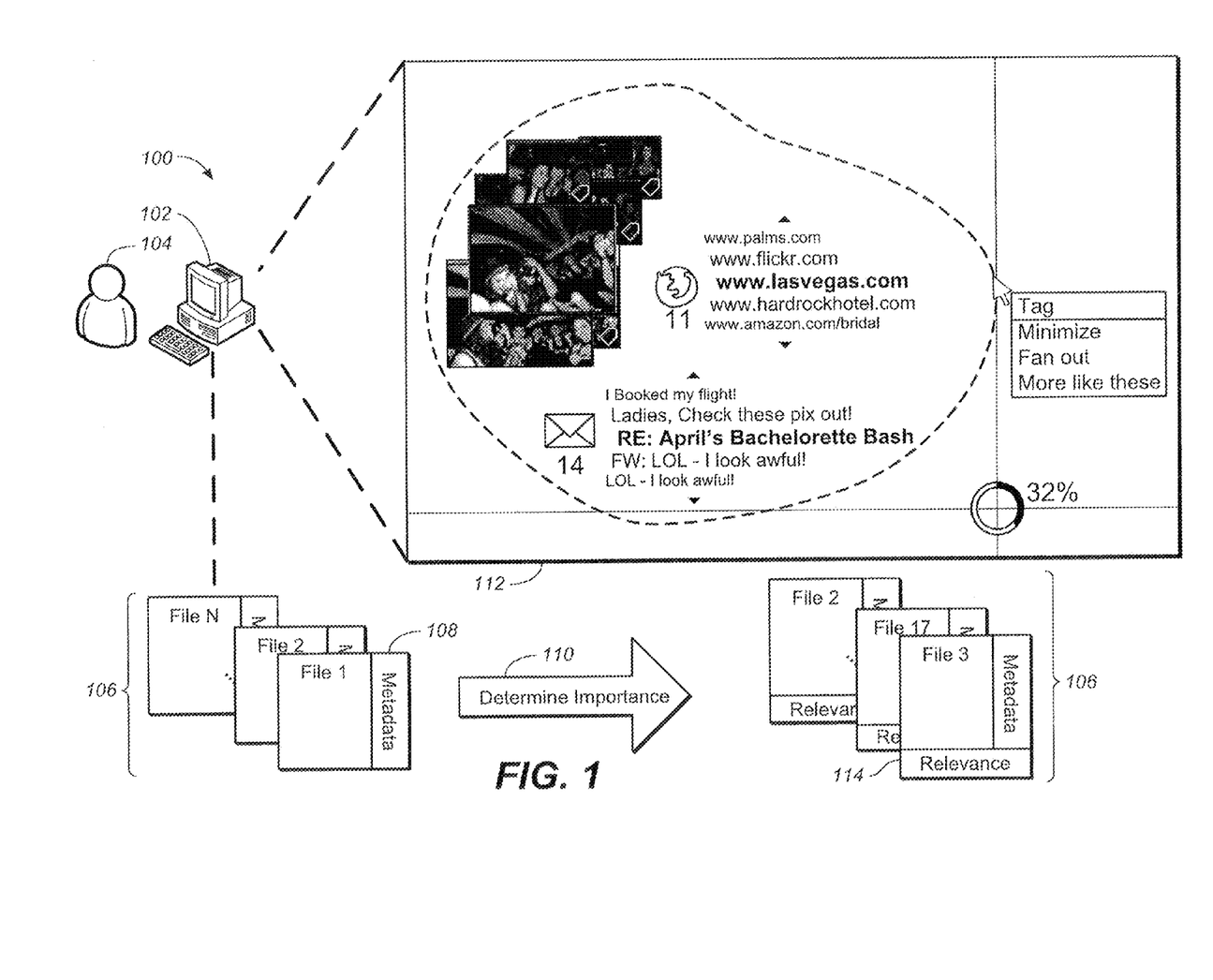
FIG. 1 is an overview of an information management system.

FIG. 1 is an overview of an information management system 100. In general, a computer system 102 can include an information management system that groups interrelated files 106 that are stored on, or retrievable by, the computer system 102, ranks (at 110) the files 106 in order of importance or relevance to the user, and presents the files 106 to the user 104 such that the more important or relevant files 106 are displayed more prominently. The computer system 102 can receive input from and display results to a user 104 via a graphical user interface 112. The relative importance 114 of the files 106 can be determined using metadata 108 that are associated with the files 106.

A computer system 102 is any combination of data storage and data processing apparatus capable of accessing and storing files 106, determining the relative importance 114 of files 106 based on metadata 108, and presenting an organized depiction of the files 106 to the user 104 based on the relative importance 114. The computer system 102 can directly store the files 106 and associated metadata 108. The computer system 102 can indirectly access and store the files 106 and/or the metadata 108 on another device that is communicatively connected to the computer system 102. For example, the files can be stored and accessed using one or more remote file servers or other similar devices. A computer system 102 can be any general purpose or special purpose computing machine, and includes, by way of example only, desktop and laptop computers, PocketPCs, Blackberry devices, and other specialized hardware devices.

To provide for interaction with a user 104, the computer system 102 can have a display device, e.g., a CRT (cathode ray tube) or LCD (liquid crystal display) monitor, for displaying information, such as graphical user interface 112, to the user 104 and a keyboard and a pointing device, e.g., a mouse or a trackball, by which the user can provide input to the computer system 102. Other kinds of devices can be used to provide for interaction with a user 104 as well; for example, feedback provided to the user 104 can be any form of sensory feedback, e.g., visual feedback, auditory feedback, or tactile feedback; and input from the user can be received in any form, including acoustic, speech, or tactile input.

The files 106 can be stored in data storage media physically attached to or incorporated into the computer system 102, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The files 106 can be stored in network attached storage that is connected to the computer system 102 over a network. Multiple data storage media can be used by a single computer system 102, such as a RAID (Redundant Array of Inexpensive Disks) connected directly or over a network to computer system 102. Any combinations of the data storage media can be used to store files 106. The computer system 102 can be a network of communicatively coupled computing machines, and files 106 can be stored across multiple networks and/or computing machines. Files 106 can be stored on remote storage devices and accessed over the Internet.

Files 106 can be any of a variety of types of files that are stored on a computer system 102. These include, by way of example only, electronic documents, such as PDF (Portable Document Format), ODF (OpenDocument format), and electronic mail (e.g., eml and msg); image/graphics files, such as JPEG (Joint Photographic Experts Group), SVG (Scalable Vector Graphics), and PNG (Portable Network Graphics); webpages in HTML (HyperText Markup Language) and links to websites; and music and videos, such as MPEG-4 (Moving Picture Experts Group 4 standard) and MP3 (MPEG-1 Audio Layer 3), to name just a few. A group of files 106 can be related to the same or similar subject matter, and/or clustered around a theme. Multiple groups of related files 106 can be organized or indexed, and a file 106 can belong to one or more groups of related files 106. Files 106 of different file types can belong to the same group of related files.

Each file 106 can contain or be associated with metadata 108. Metadata 108 is data about a file 106 that is not necessarily related to the actual content of the file 106. For example, metadata 108 about a file 106 can include the last time the file 106 was accessed, edited, or opened. Metadata 108 can take on many forms and encapsulate numerous types of information about a file or item, which includes, for example, information related to file creation, file editing, file saving, saving to a particular important location, commenting in a document, copying to and pasting from a document, taking a screen capture, opening an item after a search query, leaving an item open (duration), revisiting an item (how often and how recent), forwarding an item by email, sharing an item to a network location, posting to a web site, linking an item from another item, embedding an item in another item, using a default naming version or explicitly naming a file. The metadata 108 can be collected over time and stored in data storage media in separate files or incorporated within the files to which they are related.

The information management system 100 can also determine (at 110) the importance or relevance 114 of the files 106 using the metadata 108 and/or input by the user 104. This determination can be performed by software executing on the computer system 102. The software, which can also include functionality for collecting the metadata, can be integrated in hardware contained in the computer system 102, contained within an operating system running on the computer system 102, contained in a stand-alone application that is executed by the operating system, or any combination of the foregoing. The user 104 can use the graphical user interface 112 to specify desirable or preferred attributes of files that are of interest to the user 104. For example, a user 104 can specify an interest in websites, email, images, and documents that have been viewed, created, or shared in the last week. The information management system 100 can then use the user's specifications and preferences along with the metadata 108 to determine the relative relevance 114 or importance of the files 106. The files 106 can be ranked based on their relevance 114. For example, "File 3" and "File 17" of the files 106 can be the most relevant files and be assigned a relevance 114 so indicating. The relevance 114 can be stored with metadata 108, in files distinct from files 106, and/or incorporated within the files to which they are related. A file 106 can be associated with more than one group of interrelated files, and can be associated with more than one relevance 114, with each relevance 114 being associated with the file 106 as it relates to other files within a particular interrelated group of files.

The graphical user interface 112 can receive a user's preferences. The graphical user interface 112 is used to display visual representations of the files 106 to the user 104 in a way that emphasizes the more important and/or relevant files. The GUI 112 can group the files by file type, such that the most important files of each type are displayed most prominently. For example, for an image or graphics file that is ranked highest as the most important or relevant file relative to the others, the GUI 112 can display that image file much larger than other image files that are related to the subject matter. Similarly, the subject lines for relatively important emails can be displayed with larger or distinctive fonts and/or distinctive colors. For websites, the URLs (Universal Resource Locators) can be displayed with larger or distinctive fonts and/or distinctive colors. The first pages of important documents can be displayed larger than the first pages of other less important documents. Other mechanisms can be used to make the more important files capture the attention of a user 104. For example, motion and animation can be used such that important files move or move faster than other files or change color. These are just a few examples, but any mechanism that emphasizes certain files over others can be used.

Figure 2A:
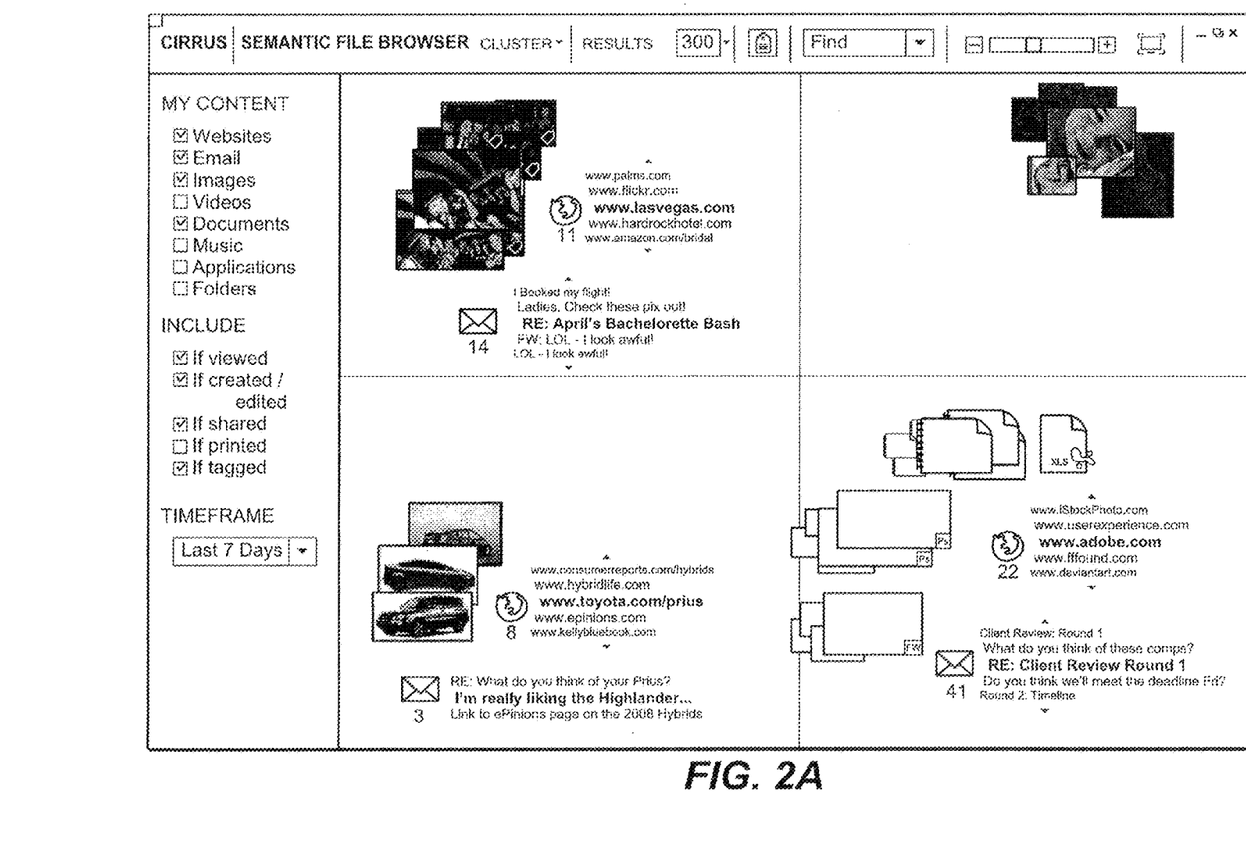
FIGS. 2A-2C are screenshots of an example graphical user interface for intuitive file management.
Figure 2B:
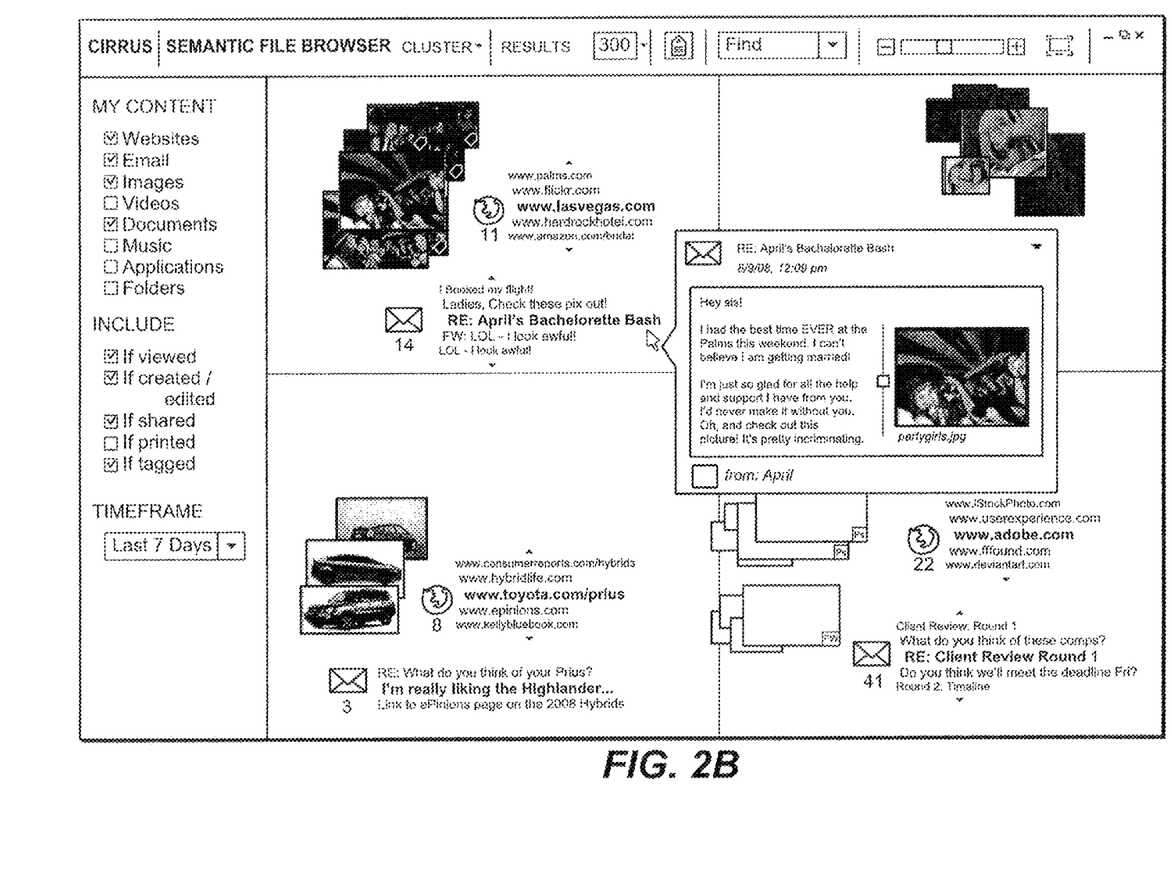
Figure 2C:
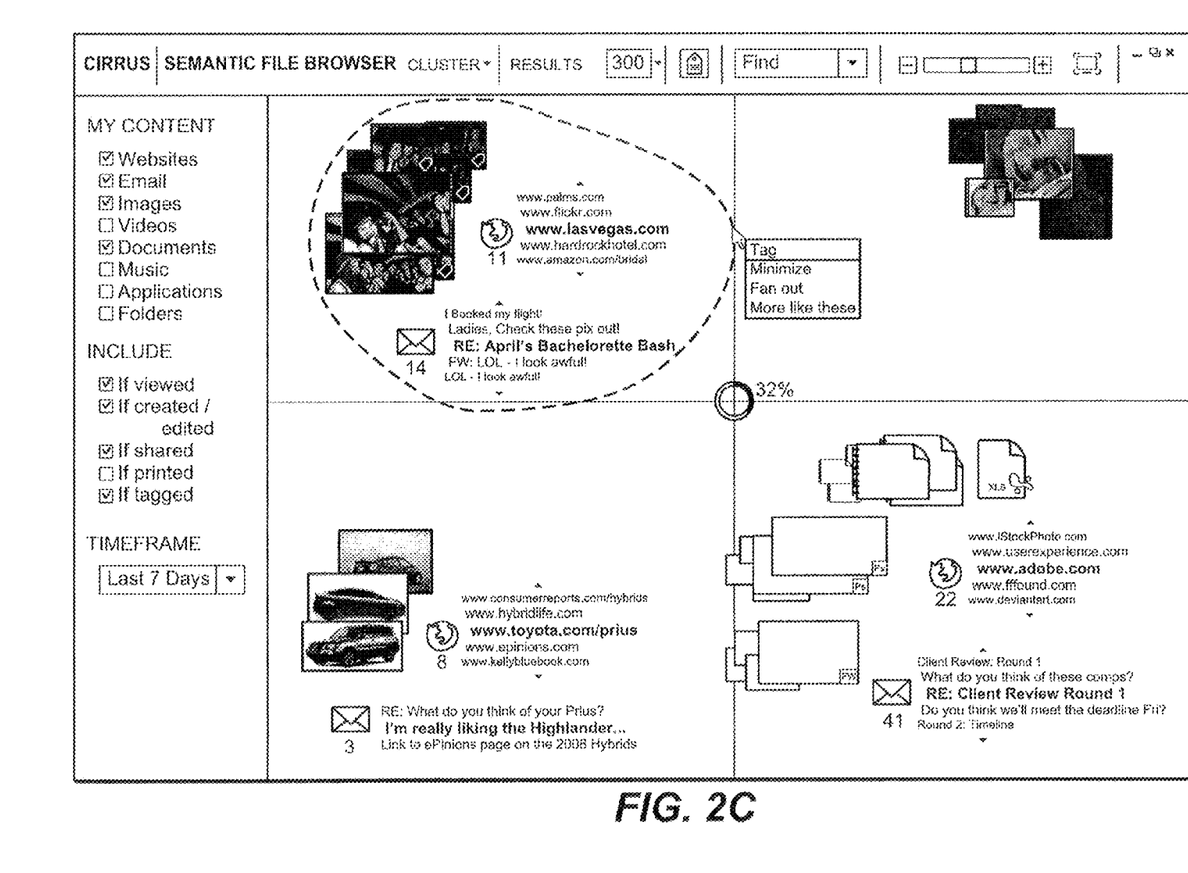

In operation, a user 104 can interact with a graphical user interface 112. FIGS. 2A-2C are screenshots of an example graphical user interface for intuitive file management. A user 104 can have many real-life roles, activities and interests. A computer system 102 can be shared by multiple users, such as spouses. A first user 104 can be a professional graphic designer, working for a small firm and having professional interests, personal interests, and hobbies that include: finding desirable examples of visual and typographic design; environmental activism and eco-design practices; watching competitive tennis; cooking (especially with local and organic foods); and nature photography. A second user 104 can be a professional pilot who has interests and activities that are different from the first user 104, such as aviation history and video games.

As interests change, so can a user's interactions with a computer system. For example, the first user 104 can become interested in pre-natal nutrition, midwifery, schools, parenting, baby products, and the like, because soon the user will have a child and more frequently searches the Internet for content related to child birth. In preparation for having a family, the first and second users may be shopping for a car, but want to find something safe with low emissions. The user 104 can become involved with the activities of others, such as helping a family member plan a wedding later in the year. The family member may have recently had a bachelorette party. Some of a user's interests, like design, cooking and environmentalism, can be long-term. Others, like researching wedding caterers and car shopping, are temporary and revolve around an event or decision. The user 104, thus, can interact with content (creating, sharing, viewing) related to each of the user's roles and interests on a single computer system 102.

As an example, the first user 104 may work in advertising and can have multiple files associated with multiple professional contracts, such as an Adobe contract and a Toyota contract. Unless the user 104 is diligent in organizing the contracts into system file folders and the like, the files can become more difficult to track and find. For example, all files related the Toyota project may not be centrally located. When the files are of different types, such as email, pictures, websites, and electronic documents, but relate to the same subject matter, such as the Toyota project, then searching for all of the related files can be difficult. The files can be associated with one another such that files related to the Toyota project are clustered together. The cluster can contain all the emails relating to the Toyota project, their attachments, the contacts for people who are involved in the email conversations, and any documents that might be related to the Toyota project.

A grouping 106 can contain a few, hundreds, or even thousands of files. For example, the Toyota project may span years and have thousands of emails associated with it, many of which may not be of interest to a user seeking the project's current status. A user can indicate a preference for items, for example, associated with the last seven days in the Toyota project. The system can determine the relative importance of an item using the user's preferences and metadata that track indications of interest or importance, which can include, for example, information about creating an item, tagging the item, opening the item, opening the item for longer versus shorter time period, opening an item many times over a period of time, forwarding the item as an email attachment. The indications of interest or importance can be taken in combination with each other to determine the relative importance of an item.

The user can specify or the system can determine from context that a user is more interested in items associated with a certain time period, or the items over the past day. For example, related files that are actively edited over the past month may be deemed as more important than files that are newer, but not recently edited.

For example, FIG. 2A shows controls that can facilitate searching by limiting the number of results displayed. Other controls shown can allow a user to zoom in and out to display different portions of the results. In the left pane are filters, which restrict the results displayed, for example, to websites, email, images, and documents. The bottom of the left pane contains a time frame element. The user can specify an interest in the last seven days (as shown), or a longer or shorter period of time. The center of the display shows four groupings of files, one of which is encircled in FIG. 2C. The groupings can be related to certain subject matter. For example, the encircled grouping can relate to planning the wedding and bachelorette party. The upper right grouping can relate to having a child, and the bottom right can relate to the Toyota project. The bottom left can relate to purchasing a new car. The groupings on screen can be a filtered version of a more expansive grouping, in order to show the user the most interesting items as determined based on the metadata.

Within a grouping, files can be further organized according to file type. As shown in the upper left grouping encircled in FIG. 2C, there are three file types: images, websites and emails. The bottom right grouping in FIG. 2C, which is not encircled, has a more complicated organization with more file types, such as spreadsheet documents, emails, and PDF documents. Files of each type can be arranged as a montage. The more interesting files can be displayed in a larger font or size. For example, the email "RE: April's Bachelorette Bash" may be the most relevant email given the criteria. The email and/or its attachments may have been forwarded, printed, and opened several times over the last seven days, which can cause the system to assign it a relatively high importance.

FIG. 2B demonstrates a way to preview the contents of a selection. In this case, the whole email with an attached image can be seen in the preview of the email. The user can scroll around and examine items closer.

In FIG. 2C, a user can select (as demonstrated by the encircling) a grouping. An option to add a tag to the whole grouping can be performed, if the user wants to have tags or key words for subsequent use (e.g., further along a work flow). The selection could also be minimized or expanded ("fanned out"). The user can also perform a content type search whereby other items similar to the selected grouping can be found.

Figure 3:
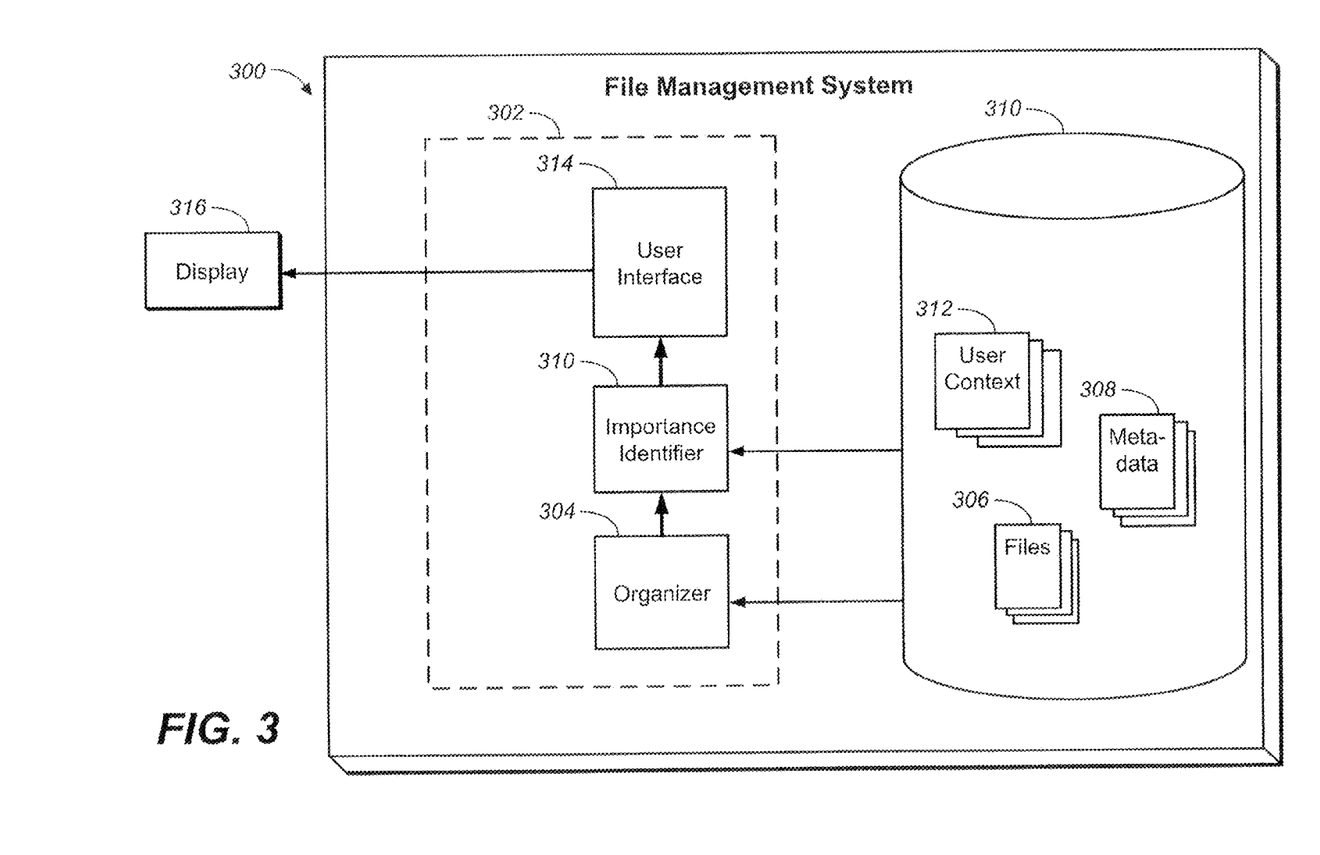
FIG. 3 is a block diagram of an intuitive file management system.

FIG. 3 is a block diagram of an intuitive file management system 300. A file management system 300 includes file management software 302 and data storage media 310. In general, the organizer 304 indexes files 306 into one or more groups of related files, the importance identifier 310 determines the relative importance of interrelated files within a particular group, and representations of the files are displayed by the user interface 314.

The file management software 302 can function to receive user context 312, to access files 306 and related metadata 308, to determine the relative importance of the files 306, and to provide an intuitive view of the files 306 based on the importance. The software 302 (also known as a computer program, a program, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions of the software 302 can be performed by one or more programmable processors executing one or more computer programs to perform functions by operating on input data and generating output. The functions of the software 302 can also be performed by, and apparatus can also be implemented as, special purpose logic circuitry, e.g., an FPGA (field programmable gate array) or an ASIC (application specific integrated circuit).

The file management software 302 can include an organizer 304, an importance identifier 310, and a user interface 314. The organizer 304 operates to cluster and associate files that share some attributes, such as being related to the same subject matter. The associations between files can be loose relationships that are discovered based partly on how files are accessed, stored, and/or used in relation to other files, and the actual data content of the files.

The importance identifier 310 acts to determine the relative importance of the files 306 using the user context 312 and the metadata 308. The user context 312 can be based on a user's explicit instructions such as an instruction to not consider music or videos in the results. The user context 312 can also be based on what the user was doing before using the file management software 302 to locate a file. For example, a user may be preparing a presentation for work just before using the file management software 302 to locate a file containing a drawing to incorporate into the presentation. Based on the fact that the user was looking to attach a drawing in a presentation, files having some history of being attached to presentations may be more interesting or relevant. Drawings that are related to the same subject matter of the presentation may also be more interesting or relevant.

The metadata 308 can contain information about each file, such as each file's usage history. The metadata 308 can contain history such as whether and how often a file had been incorporated into a presentation or the last time the file was accessed or edited. In the example where a user is preparing a presentation, the software 302 can examine the metadata 308 associated with the files. Files that have been incorporated into several past presentations can be displayed more prominently than those that have never been incorporated into a presentation. File that are more recently accessed or edited can be more prominently displayed.

The user interface 314 can receive the results from the importance identifier 310 and display representations of files 306 to the user on the display 316. The user interface 314 can have logic that is configurable, for example, to a user's preferences as to how important files are displayed. For example, to display prominently files, important files can be shown bigger than other files, can be displayed in distinctive colors, and/or can be animated. Combinations of these can be used to prominently display relevant files. Similarly, less relevant files can appear smaller, faded, and/or motionless. When multiple groups of interrelated files are shown in a single display 316, the user interface 314 can visually separate the distinct groups. Each of the groups can have different files displayed more prominently in a montage. Within a single group, files of different types can be further visually separated such that, for example, pictures appear near other pictures and emails appear near other emails. A user can concentrate on a particular group by performing a zooming or similar function with the user interface 314.

Figure 4A:
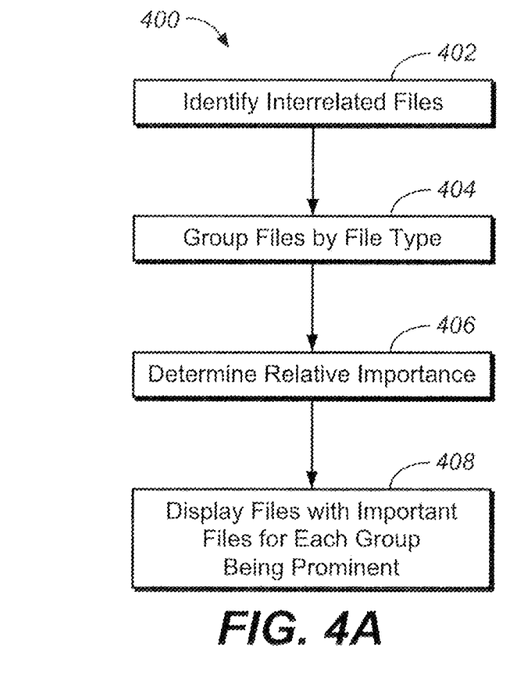
FIG. 4A is a flowchart of a process for intuitive management of electronic files.

FIG. 4A is a flowchart of a process 400 for intuitive management of electronic files. At 402, interrelated files are identified. Files that share some commonality, such as relating to similar topic or subject matter, can be identified. At 404, files can be grouped by file type. The grouping can be by the particular file extension or format associated with a file or can be more generic. Some example image file types include Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), and Extended Dynamic Range Image File Format (OpenEXR, developed by Industrial Light and Magic of San Francisco, Calif.). For example, image files can all be grouped together or further subdivided based on the file extensions, such as JPG or GIF.

At 406, the relative importance of the files is determined. The relative importance or relevance can be determined based on attributes about the files. These attributes can be captured in metadata associated with the files. Metadata can include, among other things, the file creation date, whether a file has a title, to whom an email is sent, and whether it was attached to an email or incorporated in another document. In addition to the metadata, the relevance can be determined using input from a user. The user input can include explicit direction as to which file attributes are considered more interesting. The input can also include the context in which the user began to search for a file, such as the application that was last used and/or the command that was last executed by the user. The relative importance can be represented by a numerical index or ranking that is calculated based on assigning weights to the metadata associated with the files.

At 408, representations of the files are presented to a user with the important files for each group of similar types being prominently displayed. Display prominence can be manifested in any of several ways. For example, the representative item associated with the file can be sized according to importance, with larger sizes being associated with more important files. Motion and animation can be used, such as causing more important items to rotate or move on the screen. Color can be used to display importance or relevance, with more important items having more vibrant colors and less important items having duller colors.

Figure 4B:
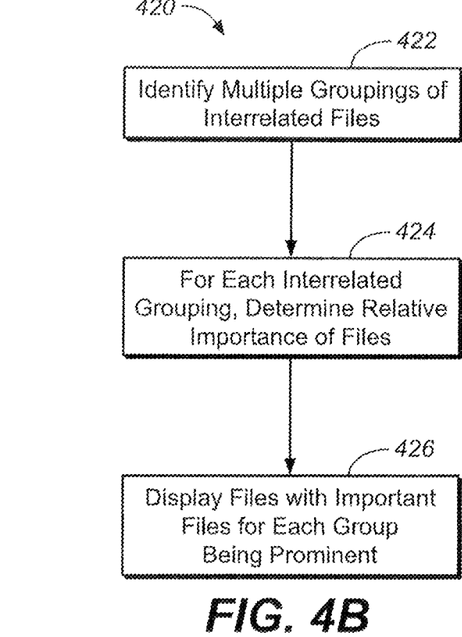
FIG. 4B is a flowchart of a process for intuitive management of multiple groups of interrelated electronic files.

FIG. 4B is a flowchart of a process 420 for intuitive management of multiple groups of interrelated electronic files. At 422, multiple topic groupings of interrelated files can be identified. Files within a particular topic grouping of interrelated files can share a common subject matter or purpose. Files can also be associated with more than one topic grouping. At 424, for each topic grouping, the relative importance of files within the group can be determined. For files belonging to more than one topic grouping, the file can have a different relative importance in each group. For example, a hybrid car photograph may appear in a first topic grouping related to cars and a second grouping related to environmentalism. The relative importance of the hybrid car photograph in the first topic grouping may be higher than the photograph's relative importance in the second topic grouping. At 426, the files can be displayed for each topic grouping in a montage. The more important files can be displayed more prominently than the less important files. Each topic grouping of interrelated files can have its own section of the display or can be shown on different pages or screens. A user can choose to zoom in or focus in on a particular group to the exclusion of the other groups.

The functional operations described in this specification can be implemented as a sequence of operations performed by a data processing apparatus on data stored on a computer-readable storage device. In some embodiments, the data is received by a data processing apparatus in the form of digital or binary information encoded in an electrical or electronic signal. In some embodiments, the operations include signal processing to manipulate, combine, or compare data. In some cases, the operations involve processing specific data using an algorithm. The operations performed on the data result in generation of new data. Additional operations can be performed on the new data or the new data can be encoded in an electrical or electronic signal for storage on a computer-readable medium, for further processing by a data processing apparatus, or for presentation on a user interface. In some embodiments, at least some of the data represents aspects or properties of a physical object or substance, information for presentation on a user interface, information about characteristics of, or relationships between, other data stored on a computer-readable storage device, or a combination of these. The data can be in the form of bits, values, symbols, characters, terms, numbers, or the like.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. In addition, the apparatus can employ various different computing model infrastructures, such as web services, distributed computing and grid computing infrastructures.

The term "specific apparatus" or "special purpose computer" includes a general purpose computer that is specifically programmed to perform particular operations pursuant to instructions in computer software. A specific apparatus is capable of manipulating or transforming specific electronic data in accordance with instructions to perform the particular operations. Unless specifically stated otherwise, terms such as "processing," "computing," "calculating," determining," or the like refer to actions or processes of a specific apparatus.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, an analysis of content and a user's interaction with that content can be performed, and the results of that analysis can be used to determine types of third party messages that would be appropriate to display to the user. To illustrate, a user can have content of interest that is clustered into groupings related to a wedding, a car shopping, exercise, and her professional work as a graphic designer. The groupings and related information can be passed via the Internet to a third party wishing to directly market products or services to the user. Targeted advertisements about products supporting design work, car shopping, and/or weddings can be provided to the user. These messages can be provided directly in the context of the content browsing experience, and can adopt rules of relevance and positioning in the interface that indicate the messages relevance to a given content cluster. A similar approach can be used in positioning advertisement content in web browsing experiences.

What is claimed is:

1. A computerized method comprising:
identifying a plurality of interrelated files stored on one or more storage devices for each of a plurality of topic groupings, wherein the interrelated files corresponding to a particular topic grouping are determined based on first metadata associated with the interrelated files;
receiving an indication of a user initiating a search for a file;
determining a relative importance for each of the plurality of interrelated files within each topic grouping, the relative importance indicating an importance of each of the interrelated files in a corresponding topic grouping relative to other files in the corresponding topic grouping based on contextual relevance of individual of the interrelated files to an application with which the user was interacting prior to initiating the search for the file, such that an interrelated file that is more contextually relevant to the application with which the user was interacting than a different interrelated file has a higher relative importance than the different interrelated file; and
displaying a montage of visual representations of the plurality of interrelated files for each topic grouping using a visual indication of the relative importance, wherein the montage for each topic grouping includes a plurality of partially overlapping visual representations and the relative importance of the plurality of interrelated files for each topic grouping is indicated by a relative prominence of each of the visual representations within the plurality of partially overlapping visual representations.

2. The method of claim 1, wherein the relative importance comprises a first relative importance, the user comprises a first user, and the method further comprises determining a second relative importance for each of the plurality of interrelated files within each topic grouping, the second relative importance based on second metadata associated with the plurality of interrelated files, wherein the second metadata indicates at least one of a frequency or a timing of access, by a second user, of files in the plurality of interrelated files.

3. The method of claim 2, wherein the second metadata further comprises data related to at least one of: file creation, file editing, file saving, opening an item after a search query, a duration of time that a file is open, a number of times that a file is accessed, or a forwarding of the file via an electronic mail message.

4. The method of claim 1, wherein the plurality of interrelated files comprises a first subset of interrelated files associated with a first file type, and a second subset of interrelated files associated with a second file type, the method further comprising:
displaying a first montage of visual representations of the first subset of interrelated files using a visual indication of the relative importance of each of the files in the first subset of interrelated files; and
displaying a second montage of visual representations of the second subset of interrelated files using a visual indication of the relative importance of each of the files in the second subset of interrelated files, wherein the display of the first montage is visually distinct from the display of the second montage.

5. The method of claim 4, wherein the first subset of interrelated files associated with the first file type comprises one of: a subset of Microsoft Bitmap files, a subset of Graphics Interchange Format files, a subset of Tagged Image File Format files, or a subset of Joint Photographic Experts Group files.

6. The method of claim 4, wherein the first subset of interrelated files associated with the first file type comprises one of: a subset of image files, a subset of document files, a subset of spreadsheet files, a subset of electronic mail files, or a subset of web pages.

7. The method of claim 1, wherein the first metadata associated with the plurality of interrelated files comprises metadata associated with each of the plurality of interrelated files.

8. The method of claim 1, wherein the relative prominence of each of the visual representations within the plurality of partially overlapping visual representations is manifested by one or more of: a relative size of each visual representation, a relative motion of each visual representation, a relative color intensity of each visual representation.

9. The method of claim 1, wherein:
determining the relative importance for each of the plurality of interrelated files within each topic grouping includes determining an importance value for each of the plurality of interrelated files, wherein each of the plurality of interrelated files is assigned a different importance value, and
displaying the montage of visual representations of the plurality of interrelated files for each topic grouping using the visual indication of the relative importance includes displaying each visual representation at a level of prominence indicating the importance value of file associated with the visual representation, each visual representation having a different level of prominence.

10. The method of claim 1, wherein displaying the montage of visual representations of the plurality of interrelated files for each topic grouping includes displaying the visual representations at three or more different levels of prominence.

11. An article comprising a non-transitory computer-readable medium storing instructions that, when executed by one or more computers, cause the one or more computers to perform operations comprising:
identifying a plurality of interrelated files stored on one or more storage devices for each of a plurality of topic groupings, wherein the interrelated files corresponding to a particular topic grouping are determined based on first metadata associated with the interrelated files;

receiving an indication of a user initiating a search for a file;

determining a relative importance for each of the plurality of interrelated files within each topic grouping, the relative importance indicating an importance of each of the interrelated files in a corresponding topic grouping relative to other files in the corresponding topic grouping based on contextual relevance of individual of the interrelated files to an application with which the user was interacting prior to initiating the search for the file such that an interrelated file that is more contextually relevant to the application with which the user was interacting than a different interrelated file has a higher relative importance than the different interrelated file; and displaying a montage of visual representations of the plurality of interrelated files for each topic grouping using a visual indication of the relative importance, wherein the montage for each topic grouping includes a plurality of partially overlapping visual representations and the relative importance of the plurality of interrelated files for each topic grouping is indicated by a relative prominence of each of the visual representations within the plurality of partially overlapping visual representations.

12. The article of claim 11, wherein the user is a first user and the relative importance comprises a first relative importance and the operations further comprise:

determining a second relative importance for each of the plurality of interrelated files within each topic grouping based on second metadata associated with the plurality of interrelated files, wherein the second metadata indicates at least one of a frequency or a timing of access, by a second user, of files in the plurality of interrelated files.

13. The article of claim 11, wherein the plurality of interrelated files comprises a first subset of interrelated files associated with a first file type, and a second subset of interrelated files associated with a second file type, the method further comprising:

displaying a first montage of visual representations of the first subset of interrelated files using a visual indication of the relative importance of each of the files in the first subset of interrelated files; and displaying a second montage of visual representations of the second subset of interrelated files using a visual indication of the relative importance of each of the files in the second subset of interrelated files, wherein the display of the first montage is visually distinct from the display of the second montage.

14. The article of claim 13, wherein the first subset of interrelated files associated with the first file type comprises one of: a subset of image files, a subset of document files, a subset of spreadsheet files, a subset of electronic mail files, or a subset of web pages.

15. The article of claim 11, wherein the first metadata associated with the plurality of interrelated files comprises metadata associated with each of the plurality of interrelated files.

16. A system comprising:

a memory storing a plurality of interrelated files; and one or more data processing apparatus operable to interact with the memory and to perform operations in accordance with instructions stored on a computer readable medium, the operations comprising:

identifying a plurality of interrelated files stored on one or more storage devices for each of a plurality of topic groupings, wherein the interrelated files corresponding to a particular topic grouping are determined based on first metadata associated with the interrelated files;

receiving an indication of a user initiating a search for a file;

determining a relative importance for each of the plurality of interrelated files within each topic grouping, the relative importance indicating an importance of each of the interrelated files in a corresponding topic grouping relative to other files in the corresponding topic grouping based on contextual relevance of individual of the interrelated files to an application with which the user was interacting prior to initiating the search for the file such that an interrelated file that is more contextually relevant to the application with which the user was interacting than a different interrelated file has a higher relative importance than the different interrelated file; and displaying a montage of visual representations of the plurality of interrelated files for each topic grouping using a visual indication of the relative importance, wherein the montage for each topic grouping includes a plurality of partially overlapping visual representations and the relative importance of the plurality of interrelated files for each topic grouping is indicated by a relative prominence of each of the visual representations within the plurality of partially overlapping visual representations.

17. The system of claim 16, wherein the user is a first user and the relative importance comprises a first relative importance and the operations further comprise:

determining a second relative importance for each of the plurality of interrelated files within each topic grouping based on second metadata associated with the plurality of interrelated files, wherein the second metadata indicates at least one of a frequency or a timing of access, by a second user, of files in the plurality of interrelated files.

18. The system of claim 16, wherein the plurality of interrelated files comprises a first subset of interrelated files associated with a first file type, and a second subset of interrelated files associated with a second file type, the method further comprising:

displaying a first montage of visual representations of the first subset of interrelated files using a visual indication of the relative importance of each of the files in the first subset of interrelated files; and displaying a second montage of visual representations of the second subset of interrelated files using a visual indication of the relative importance of each of the files in the second subset of interrelated files, wherein the display of the first montage is visually distinct from the display of the second montage.

19. The system of claim 18, wherein the first subset of interrelated files associated with the first file type comprises one of: a subset of image files, a subset of document files, a subset of spreadsheet files, a subset of electronic mail files, or a subset of web pages.

20. The system of claim 16, wherein the first metadata associated with the plurality of interrelated files comprises metadata associated with each of the plurality of interrelated files.

21. A method comprising:

identifying multiple sets of interrelated files;

determining a relative significance of each file within each set, the relative significance based on contextual relevance of individual of the interrelated files to an application with which a user was most recently interacting such that a file that is more contextually relevant to the application with which the user was most recently interacting than a different file has a higher relative significance than the different file; and displaying visual representations corresponding to at least a portion of the files in each set, wherein the displayed visual representations for each set are visually grouped on a display distinct from the displayed visual representations for other sets and the displayed representations within each set are displayed according to the relative significance of each of the displayed files in each set, wherein the relative significance of each of the displayed files in each set is indicated by a relative prominence of the displayed representation corresponding to the file within the displayed visual representations for the set.

22. The method of claim 21, wherein the relative significance of each file within the set if further determined based on metadata that comprises data related to at least one of: file creation, file editing, file saving, opening an item after a search query, a duration of time that a file is open, a number of times that a file is accessed, or a forwarding of the file via an electronic mail message.

23. The method of claim 22, wherein the metadata associated with the plurality of interrelated files comprises metadata associated with each of the plurality of interrelated files.

24. A method comprising:

executing instructions on a specific apparatus to identify a plurality of interrelated files stored on one or more storage devices for each of a plurality of topic groupings, wherein the interrelated files corresponding to a particular topic grouping are determined based on first metadata associated with the interrelated files;

executing instructions on a specific apparatus to determine a relative importance for each of the plurality of interrelated files within each topic grouping, the relative importance indicating an importance of each of the interrelated files in a corresponding topic grouping relative to other files in the corresponding topic grouping based on contextual relevance of individual of the interrelated files to an application with which the user was most recently interacting such that an interrelated file that is more contextually relevant to the application with which the user was most recently interacting than a different interrelated file has a higher relative importance than the different interrelated file;

storing data representing the relative importance of each of the plurality of interrelated files in a computer-readable storage medium; and displaying a montage of visual representations of the plurality of interrelated files for each topic grouping using a visual indication of the relative importance, wherein the montage for each topic grouping includes a plurality of partially overlapping visual representations and the relative importance of the plurality of interrelated files for each topic grouping is indicated by a relative prominence of the visual representations within the plurality of partially overlapping visual representations.

* * * * *